Sept. 12, 1961
A. S. KESTON
2,999,418
POLARIMETRIC APPARATUS
Filed March 31, 1958
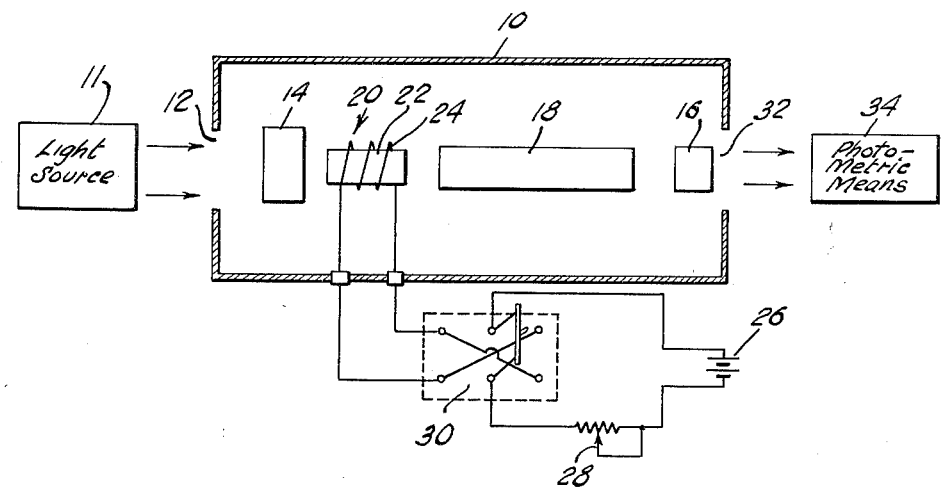
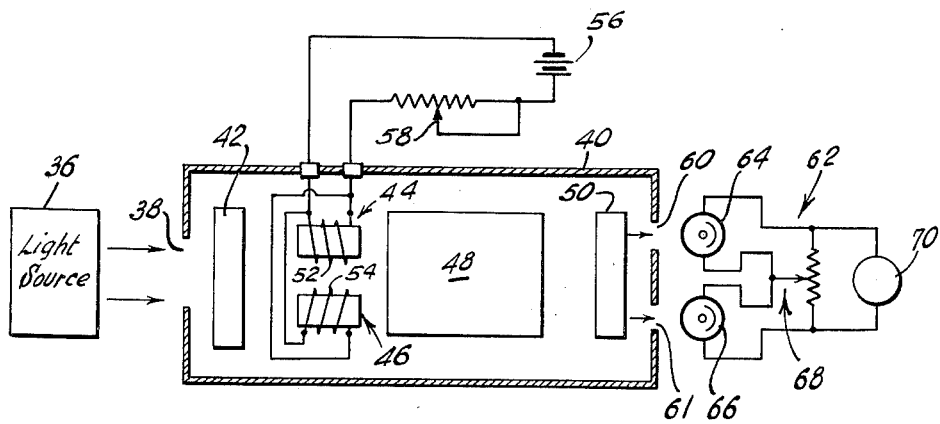
INVENTOR.
ALBERT S. KESTON
BY
Curtis, Morris & Safford.
ATTORNEYS:

United States Patent Office 2,999,418
Patented Sept. 12, 1961

2,999,418
POLARIMETRIC APPARATUS
Albert S. Keston, 67 Bonn Place, Weehawken, N.J.
Filed Mar. 31, 1958, Ser. No. 725,148
10 Claims. (Cl. 88—14)

The present invention relates in general to polarimetry and it is a principal object of the invention to provide an improved polarimetric method and apparatus. This application is a continuation-in-part of my pending application Serial No. 240,598, filed August 6, 1951, now Patent 2,829,555, granted April 8, 1958.

Conventionally, a polarimeter includes at least two polarizing elements, which may be Nicol prisms, sheet material containing polarizing crystals, and the like. One of the polarizing elements, usually termed the polarizer, may be fixed and the other, usually designated as the analyzer, is rotatable so that the angle between the polarizing axes of the two elements may be varied. When light is directed through the two polarizing elements of such a conventional polarimeter, in a direction from the polarizer to the analyzer, maximum light transmission is attained when the polarizing axes of the polarizer and analyzer are parallel and substantially zero light transmission, or extinction, is attained when the polarizing axes of the polarizer and the analyzer are perpendicular to each other. In other words, if the analyzer is rotated into a position such that its polarizing axis is parallel to the plane of polarization of the beam of plane polarized light passed by the polarizer, maximum light transmissions through the analyzer is attained, and, if the analyzer is rotated to a position such that its polarizing axis is perpendicular to the plane of polarization of the plane polarized light transmitted by the polarizer, extinction is attained. The conventional polarimeter includes a divided circle for indicating the angular position of the analyzer to the left or right of extinction.

Polarimeters are widely used in identifying and determining the concentrations of optically active substances, an optically active substance being one which rotates the plane of polarization of plane polarized light passing therethrough. In the conventional polarimeter discussed in the preceding paragraph, if an optically active substance, such as an optically active solution, is placed between the polarizer and the analyzer, the plane of polarization of the plane polarized light transmitted by the polarizer is rotated through an angle which depends on the nature of the substance and its concentration, the direction of rotation of the plane of polarization also depending on the nature of the substance. Consequently, if the analyzer was previously set for extinction, the analyzer no longer produces extinction due to rotation of the plane of the polarized light, produced by the polarizer, by a substance placed in the beam between the polarizer and the analyzer. Consequently, the angle of rotation produced by the substance may be determined by rotating the analyzer to extinction and reading the angle on the divided circle associated with the analyzer. This angle is indicative of the concentration of a solution of a known substance, or is of assistance in identifying unknown substances, both the magnitude and the direction of the angle being characteristic for any optically active substance at any given concentration and temperature. If the substance rotates the plane of polarization to the left, i.e., counterclockwise as viewed against the oncoming beam, the substance is classed as levorotatory, and if to the right, or clockwise, the substance is dextrorotatory. Thus, the direction of the angle indicated by the divided circle in itself provides an elementary distinction between various substances.

Since it is difficult to determine exactly when extinction occurs in a uniformly illuminated field, even with photoelectric means, a simple polarimeter of the foregoing character is not sufficiently accurate for many applications. To minimize errors in setting the analyzer to extinction, the conventional polarimeter is provided with an element between the analyzer and the polarizer which splits the field, into two (or more) parts, effectively by rotating one or more portions of the beam with respect to the remainder of the beam, so that the two or three sections of the field are not extinguished at the same angular position of the analyzer. However, the angular position at which the two halves of the field match (or two equal outer segments match a third, central section) can be more sensitively determined than can the extinction angle in the previously described simple polarimeter. Rotation produced by a sample is then measured as the difference angle in analyzer position when fields are matched, first with an optically inactive sample, then the optically active sample. While conventional polarimeters employing field matching are more accurate than the simple conventional polarimeters discussed previously, residual, irreducible errors inherent in the limitations of eye sensitivity, in divided circle calibration, and in the reading operation itself, still are present. These are too large for work of the highest accuracy, particularly when very small angles of rotation must be measured, even when photoelectric means are employed in matching the sections of the split field.

A primary object of the present invention is to provide a polarimetric method and apparatus which attain greater accuracy and sensitivity than heretofore attainable by eliminating the divided circle.

More particularly, a primary object of the invention is to provide a method and apparatus wherein two beams of plane polarized light are employed, simultaneously or successively, with their respective planes of polarization angularly offset to the left and to the right, preferably by small angles, of a reference plane that is perpendicular to the polarizing axis of the analyzer. In other words the two beams are offset in opposite directions from the extinction position of the system.

When, in accordance with the present invention, two such beams of plane polarized light offset to opposite sides of the extinction reference plane are employed, an optically active substance in the beams rotates one of the beams away from extinction to increase the intensity of the light transmitted by the analyzer and rotates the other toward extinction to decrease the light transmitted. Under these conditions even small angles of rotation produced by substances being examined can be made to result in large changes in the relative intensities of the transmitted portions of the two beams, which is an extremely important feature of the invention.

As disclosed in my parent application Serial No. 240,958 referred to above, the desired off-setting of the two beams can be achieved in a variety of ways, such as by movement of a polarizer element or an analyzer element, or by using differently oriented polarizing or analyzing elements, or by magnetically rotating the plane of polarization of a light beam. The present continuation-in-part application is particularly directed to the latter embodiment of the invention wherein the desired off-setting of the beam is accomplished by magnetic means.

While the present invention is applicable to measuring large angles of rotation produced by substances being examined, it is particularly applicable to measuring small angles of rotation since, when small angles of rotation are being measured, small offset angles from extinction may be employed to secure large intensity changes, which is an important feature.

Considering the theory of the present invention, the intensity, I, of the light transmitted by an analyzer may be related to the intensity, $I_0$, of the light incident on the analyzer and the angle, $\theta$, from extinction, i.e., the angle between the plane of polarization of the incident light and the polarizing axis of the analyzer, substantially by the equation:

$$I = I_0 \sin^2 \theta \qquad (1)$$

neglecting small losses due to reflections and absorption. Employing subscripts L and R to identify the polarized beams offset to the left and right, respectively, of extinction, and the symbol $\phi$ for the angle of rotation of either plane of polarization by the optically active substance being examined ($\phi$ being regarded as positive if the substance is dextrorotatory and negative if the substance is levorotatory) we observe:

$$I_L = I_0 \sin^2(\theta_L - \phi) \qquad (2)$$

and $$I_R = I_0 \sin^2(\theta_R + \phi) \qquad (3)$$

When $\theta_L$, $\theta_R$ and $\phi$ are small, the sine of each of these angles may, to an adequate approximation, be taken as equal to the angle itself. Consequently, for such small angles, $$I_L = I_0 (\theta_L - \phi)^2 \qquad (4)$$

and $$I_R = I_0 (\theta_R + \phi)^2 \qquad (5)$$

In accordance with the present invention, either the difference between $I_L$ and $I_R$ may be measured, or the ratio thereof may be measured. The ratio, Z, of $I_R$ to $I_L$ is, of course, $$(\theta_R + \phi)^2 / (\theta_L - \phi)^2 \qquad (6)$$

and may be easily measured with great accuracy by means of conventional photometric apparatus of a form commonly employed in spectrophotometers. If the offset angles $\theta_R$ and $\theta_L$ are exactly known, then the angle of rotation $\phi$ of the optically active substance may be calculated for example from Equation 6. If $\theta_R$ and $\theta_L$ are not exactly known, however, the instrument may be calibrated with known rotators, i.e., with a series of solutions of known rotation at a given wavelength and temperature, and a calibration chart then plotted of rotation angle $\phi$ as a function of intensity ratio Z. Similarly a chart may be plotted of rotation angle $\phi$ as a function of the difference of the respective intensities expressed by Equations 4 and 5.

A particular advantage in measuring intensity ratio Z, rather than intensity difference, is that even large changes in intensity of the light source or in photometer sensitivity between successive pairs of measurements have no effect on accuracy, since $I_L$ and $I_R$ are affected in equal proportion. Likewise the effect of large absorption differences in successive samples is eliminated. When intensity differences are measured, the sensitivity of the photometer response must be preadjusted to a constant reference level ($I_0$) to compensate for the effect of these factors.

It is important to observe that Equations 4, 5 and 6 are valid regardless of wavelength. Thus a calibration curve constructed as described above is accurate at any wavelength, even if calibrated at a single wavelength only.

Considering now the sensitivity of the method, we observe the following: If the difference between $I_R$ and $I_L$ is small compared to either of these quantities, then the "fractional intensity change," i.e., the difference between $I_R$ and $I_L$ divided by either one, is $$1 - Z \qquad (7)$$

Or $$1 - Z = 1 - \frac{(\theta_R + \phi)^2}{(\theta_L - \phi)^2} \qquad (8)$$

Differently expressed, $$1 - Z = \frac{(\theta_L - \phi)^2 - (\theta_R + \phi)^2}{(\theta_L - \phi)^2} \qquad (9)$$

If, as is convenient, $\theta_L$ and $\theta_R$ are equal, and $\phi$ is small as compared to $\theta$, then $$1 - Z = 4 \frac{\phi}{\theta} \qquad (10)$$

Now when $\phi/\theta$ is equal to $\frac{1}{100}$, the fractional light change is $\frac{4}{100}$. Thus, if the angle $\theta$ is 1°, then a rotation angle $\phi$ of 0.01° would result in a 4% over-all change in intensity, which may readily be measured with high precision in spectrophotometers, or other apparatus including photometric means.

Reference will now be made to the accompanying drawing which illustrates two embodiments of the apparatus claimed herein and wherein:

FIGURE 1 illustrates a polarimeter having a single magnetically-actuated beam-rotating device associated with switching means for reversing the magnetic field of the device to rotate the plane of polarization of the light beam passing therethrough in opposite directions, and FIGURE 2 illustrates a polarimeter having two magnetically-actuated beam-rotating devices for producing two oppositely offset beams simultaneously.

Referring to FIGURE 1 of the drawing, the polarimeter there shown comprises a casing 10 having an aperture 12 at one end thereof. Positioned opposite the aperture 12 there is a light source 11 adapted to direct a beam of light through the aperture 12 onto a polarizer 14 having a polarizing axis which is perpendicular to the axis of an analyzer 16 located near the other end of casing 10. Disposed between the polarizer 14 and analyzer 16 there is a cell or sample chamber 18 adapted to contain the substance to be analyzed. Also disposed between the polarizer and analyzer, and more particularly between polarizer 14 and cell 18, there is a magnetic light rotator indicated generally by the numeral 20 and comprising an element 22 having a coil 24 wound therearound. The element 22 is made of a material which, when subjected to a magnetic field, rotates the plane of polarization of plane polarized light passing therethrough in one direction or the other depending upon the direction of the magnetic field, i.e. depending upon the direction of current flow through the coil 24. As is well known this phenomenon is known as the Faraday effect, and it is exhibited to some extent by nearly all transparent materials. Typical well-known materials having this property to a sufficient extent to be useful in the present polarimeter are glass, carbon bisulfide, solid and aqueous potassium mercuric iodide, ferric chloride solutions and quartz.

The coil 24 is energized by a circuit that includes a battery 26, a variable resistor 28 and a reversing switch 30. The variable resistor 28 can be used to vary the current flow through the coil and thereby change the magnetic field intensity to change the magnitude of the angle through which the polarization plane is rotated by the device 20. The reversing switch 30 is provided to reverse the direction of current flow through the coil 20 and hence the direction in which device 20 rotates the plane of polarization of the beam passing therethrough.

By reversing the current flow through coil 24 by means of switch 30 two beams of plane polarized light are consecutively produced which have planes of polarization oppositely offset from extinction with respect to the analyzer 16. As these two beams pass through the sample to be analyzed which is located within the cell 18, one of the beams is rotated by the sample substance away from the extinction plane and the other beam is rotated toward the extinction plane. Thus the portion of the first beam that passes through analyzer 16 is of increased intensity and the portion of the second beam that passes through analyzer 16 is of diminished intensity, the amount of the increase and decrease respectively being a function of the nature and concentration of the sample substance in cell 18. The two beams pass through an aperture 32 in casing 10 to a photometric means 34 which may be of a conventional and well-known type and which measures the relative intensities of the beams as an indication of the rotatory power of the sample substance within cell 18.

FIGURE 2 illustrates a modification of the polarimeter of FIGURE 1 wherein the two offset beams are passed through the sample chamber simultaneously rather than consecutively. Referring to FIGURE 2, light from a light source 36 passes through an aperture 38 of the casing 40 of the polarimeter, to and through a polarizer 42, thence successively through a pair of magnetic light rotators 44 and 46, and analysis cell 48 and an analyzer 50. The magnetic rotators 44 and 46 are provided with coils 52 and 54 respectively which are oppositely wound to produce oppositely oriented magnetic fields in the rotators 44 and 46. Thus the beams of polarized light from polarizer 42 that pass through the rotators 44 and 46 are offset in opposite directions from an intermediate reference plane that corresponds with the extinction position of the polarizing system.

The energizing circuit for the coils 52 and 54 includes a battery 56 and a variable resistor 58 by means of which the current flow through coils 52 and 54 can be varied to vary the magnitude of the offset angle. By using a single variable resistor 58 for both coils 52 and 54 the opposite angles through which the devices 44 and 46 rotate the polarization planes of the beams can be conveniently maintained equal as the magnitudes of the angles are varied.

As in the case of the embodiment of FIGURE 1 the two offset beams pass through the sample chamber 48 wherein one beam is rotated toward extinction and the other beam away from extinction by the sample within the chamber. The beams pass through the analyzer 50 and thence through apertures 60 and 61 of casing 40 to a photometric device generally designated by the numeral 62. The device 62 includes the photo cells 64 and 66 that are responsive to the two beams passing through apertures 60 and 61 respectively and are connected in a conventional bridge circuit 68 having a meter 70. The device 62 measures the ratio of the intensities of the two beams as a measure of the rotatory power of the optically active substance within the sample chamber 48.

From the foregoing description it will be evident that in both of the embodiments described above separate beams of plane polarized light are angularly offset to the left and right respectively of a reference plane corresponding to the extinction position of the polarizing system. The effect of the rotation of the planes of the two beams by a substance to be analyzed through which they pass is to decrease the intensity of the portion of one beam transmitted through the analyzer and to increase the intensity of the portion of the other beam transmitted through the analyzer. The relative intensities of the two transmitted beams, and more particularly the ratio of the intensities of the two beams, can be measured very accurately with existing photometric means. By using relatively small offset angles a substantial change in the intensity ratio is produced with a relatively small change in the angle of rotation produced by the substance being analyzed and hence exceptionally accurate results are achieved.

If desired, the casing 10 and parts associated therewith, excluding the light source 14 and photometric means 34 may be constructed as a separate unit and inserted between the light source and photometric means of a conventional polarimeter. Similarly the parts within the casing 40 comprise a novel sub-combination that may be introduced into a conventional polarimeter.

While I have disclosed two exemplary embodiments of the invention it will be understood that the invention may be embodied in other forms without necessarily departing from the spirit of the invention.

I claim:

1. A polarimeter of the type that measures the rotation of the plane of polarization of a beam of polarized light produced by a substance through which the beam passes, comprising in combination, a source of light, light polarizing means for polarizing light from said source to form two beams of plane polarized light having polarization planes that are offset in opposite directions by predetermined angles from an intermediate reference plane, said polarizing means including magnetically-actuated beam-rotating means for rotating the plane of polarization of separate portions of the light from said source to form said two offset beams, a polarization analyzer having a polarizing axis substantially perpendicular to said reference plane, a sample chamber located between said light polarizing means and said analyzer and photometric means for sensing the relative intensities of the portions of said two beams passing through said analyzer, said polarimeter having no movable beam-rotating parts in the path of said beams, whereby the intensities of the beams passing through said analyzer at the time of measurement differ as a function of, and only as a function of, the rotation of said beams by said substance in said chamber.

2. A polarimeter of the type that measures the rotation of the plane of polarization of a beam of polarized light produced by a substance through which the beam passes, comprising in combination, a source of light, light polarizer means for polarizing light from said source to form two beams of plane polarized light having polarization planes that are offset in opposite directions by predetermined angles from an intermediate reference plane, said polarizing means including a material which rotates the plane of polarization of polarized light when subjected to a magnetic field, magnetic-field-generating means associated with said material for establishing a magnetic field therein, and switching means for reversing the direction of the field established in said material to reverse the direction of rotation of said polarization plane by said material, a polarization analyzer having a polarizing axis substantially perpendicular to said reference plane, a sample chamber located between said light polarizer means and said analyzer and photometric means for sensing the relative intensities of portions of said two beams passing through said analyzer, said polarimeter having no movable beam-rotating parts in the path of said beams, whereby the intensities of the beams passing through said analyzer at the time of measurement differ as a function of, and only as a function of, the rotation of said beams by said substance in said chamber.

3. A polarimeter of the type that measures the rotation of the plane of polarization of a beam of polarized light produced by a substance through which the beam passes, comprising in combination, a source of light, light polarizer means for polarizing light from said source to form two beams of plane polarized light having polarization planes that are offset in opposite directions by predetermined angles from an intermediate reference plane, said polarizing means including a material which rotates the plane of polarization of polarized light when subjected to a magnetic field, an electrically conductive coil within which said material is located, means for supplying electrical energy to said conducting coil and switching means for reversing the direction of current flow through said coil to cause said material to reverse the direction of rotation of the plane of polarization of light passing therethrough to form said two offset beams, a polarization analyzer having a polarizing axis substantially perpendicular to said reference plane, a sample chamber located between said light polarizer means and said analyzer, and photometric means for sensing the relative intensities of the portions of said two beams passing through said analyzer, said polarimeter having no movable beam-rotating parts in the path of said beams, whereby the intensities of the beams passing through said analyzer at the time of measurement differ as a function of, and only as a function of, the rotation of said beams by said substance in said chamber.

4. A polarimeter of the type that measures the rotation of the plane of polarization of a beam of polarized light produced by a substance through which the beam passes, comprising in combination, a source of light, light polarizer means for polarizing light from said source to form two beams of plane polarized light having polarization planes that are offset in opposite directions by predetermined angles from an intermediate reference plane, said polarizing means including two beam-rotating means, each of which comprises a material which rotates the plane of polarization of the polarized light when subjected to a magnetic field, and magnetic-field-generating means associated with each of said beam-rotating means for rotating the plane of polarization of separate portions of the light from said source to form said two offset beams, a polarization analyzer having a polarizing axis substantially perpendicular to said reference plane, a sample chamber located between said light polarizer means and said analyzer and photometric means for sensing the relative intensities of the portions of said two beams passing through said analyzer, said polarimeter having no movable beam-rotating parts in the path of said beams, whereby the intensities of the beams passing through said analyzer at the time of measurement differ as a function of, and only as a function of, the rotation of said beams by said substance in said chamber.

5. A polarimeter of the type that measures the rotation of the plane of polarization of a beam of polarized light produced by a substance through which the beam passes, comprising in combination, a source of light, light polarizer means for polarizing light from said source to form two beams of plane polarized light having polarization planes that are offset in opposite directions by predetermined angles from an intermediate reference plane, said polarizer means comprising a pair of devices which rotate the plane of polarization of polarized light when subjected to a magnetic field, an electrically conductive coil surrounding each of said devices, said coils being oppositely wound to cause said two devices to rotate in opposite directions the plane of polarization of separate portions of the light from said source passing therethrough to form said two offset beams, a polarization analyzer having a polarizing axis substantially perpendicular to said reference plane, a sample chamber located between said light polarizer means and said analyzer and photometric means for sensing the relative intensities of portions of said two beams passing through said analyzer, said polarimeter having no movable beam-rotating parts in the path of said beams, whereby the intensities of the beams passing through said analyzer at the time of measurement differ as a function of, and only as a function of, the rotation of said beams by said substance in said chamber.

6. A polarimeter of the type that measures the rotation of the plane of polarization of a beam of polarized light produced by a substance through which the beam passes, comprising in combination, a source of light, light polarizer means for polarizing light from said source to form two beams of plane polarized light having polarization planes that are offset in opposite directions by predetermined angles from an intermediate reference plane, said polarizing means including a polarizing medium and magnetic beam-rotating means for rotating the plane of polarization of separate portions of the light from said polarizing medium to form said two offset beams, a polarization analyzer having a polarizing axis substantially perpendicular to said reference plane, a sample chamber located between said light polarizer means and said analyzer and photometric means for measuring the ratio of the intensities of the portions of said two beams transmitted through said analyzer to indicate the extent of rotation of the planes of said beams by said substance, said polarimeter having no movable beam-rotating parts in the path of said beams, whereby the intensities of the beams passing through said analyzer at the time of measurement differ as a function of, and only as a function of, the rotation of said beams by said substance in said chamber.

7. A polarimeter of the type that measures the rotation of the plane of a polarization of a beam of polarized light produced by a substance through which the beam passes, comprising in combination, a source of light, light polarizer means for polarizing light from said source to form two beams of plane polarized light having polarization planes that are offset in opposite directions by predetermined angles from an intermediate reference plane, said polarizing means including a polarizing medium and a device which rotates the plane of polarization of polarized light passing therethrough when subjected to a magnetic field, magnetic-field-generating means associated with said material for establishing a magnetic field therein and switching means for reversing the direction of the field established in said device to reverse the direction of rotation of said polarization plane by said material and thereby form said two offset beams, a polarization analyzer having a polarizing axis substantially perpendicular to said polarizing plane and photometric means for measuring the ratio of the intensities of the portions of said two beams transmitted through said analyzer to indicate the extent of rotation of the plane of said beams by said substance, said polarimeter having no movable beam-rotating parts in the path of said beams, whereby the intensities of the beams passing through said analyzer at the time of measurement differ as a function of, and only as a function of, the rotation of said beams by said substance in said chamber.

8. A polarimeter of the type that measures the rotation of the plane of polarization of a beam of polarized light produced by a substance through which the beam passes, comprising in combination, a source of light, light polarizer means for polarizing light from said source to form two beams of plane polarized light having polarization planes that are offset in opposite directions by small predetermined angles from an intermediate reference plane, said polarizing means including a polarizing medium and a pair of devices which rotate the plane of polarization of polarized light passing therethrough when subjected to a magnetic field, an electrically conductive coil surrounding each of said devices, said coils being wound in opposite sense to cause said devices to rotate the polarization plane of light passing therethrough in opposite directions to form said two offset beams, a polarization analyzer having a polarizing axis substantially perpendicular to said reference plane, a sample chamber located between said light polarizer means and analyzer and photometric means for measuring the ratio of the intensities of the portions of said two beams transmitted through said analyzer to indicate the extent of rotation of the planes of said beams by said substance, said polarimeter having no movable beam-rotating parts in the path of said beams, whereby the intensities of the beams passing through said analyzer at the time of measurement differ as a function of, and only as a function of, the rotation of said beams by said substance in said chamber.

9. A polarimeter of the type that measures the rotation of the plane of polarization of a beam of polarized light produced by a substance through which the beam passes, comprising in combination, a source of light, light polarizer means for polarizing light from said source to form two beams of plane polarized light having polarization planes that are offset in opposite directions by predetermined angles from an intermediate reference plane, said polarizer means comprising electromagnetic beam-rotating means for rotating the plane of polarization of separate portions of the light from said source to form said two offset beams, means for supplying electrical energy to said electromagnetic means to actuate the same, and means for regulating the supply of electrical energy to said electromagnetic means to vary the angles through which said offset beams are rotated, a polarization analyzer having a polarizing axis substantially perpendicular to said reference plane, a sample chamber located between said light polarizer means and analyzer and photometric means for sensing the relative intensities of the portions of said two beams passing through said analyzer, said polarimeter having no movable beam-rotating parts in the path of said beams, whereby the intensities of the beams passing through said analyzer at the time of measurement differ as a function of, and only as a function of, the rotation of said beams by said substance in said chamber.

10. In a polarimeter of the type that measures the rotation of the plane of polarization of a beam of polarized light produced by a substance through which the beam passes and includes a source of light for supplying light energy to be passed through a substance to be analyzed and photometric means for sensing the intensities of light energy transmitted through said substance, optical analyzing apparatus adapted to be positioned between said light source and said photometric means, said analyzing apparatus comprising light polarizer means including magnetically actuated beam rotating means for rotating the plane of polarization of separate portions of the light from said source to form two beams of plane polarized light having polarization planes that are offset in opposite directions by predetermined angles from an intermediate reference plane, a polarization analyzer having a polarizing axis substantially perpendicular to said reference plane and a sample chamber located between said beam rotating means and said analyzer, said optical analyzing appartus having no movable beam-rotating parts in the path of said beams, whereby the intensities of the beams passing through said analyzer at the time of measurement differ as a function of, and only as a function of, the rotation of said beams by said substance in said chamber.

References Cited in the file of this patent

UNITED STATES PATENTS

| | | |
|---|---|---|
| 1,767,831 | Berek | June 24, 1930 |
| 2,109,540 | Leishman | Mar. 1, 1938 |
| 2,509,068 | McMahon | May 23, 1950 |

FOREIGN PATENTS

| | | |
|---|---|---|
| 332,318 | Great Britain | July 24, 1930 |
| 540,876 | Great Britain | Nov. 4, 1941 |